United States Patent [19]

Watanabe et al.

[11] 4,060,756

[45] Nov. 29, 1977

[54] AUTOMATIC IRIS CONTROL MEANS FOR VARIABLE FOCAL LENGTH LENS SYSTEM

[75] Inventors: Naohei Watanabe, Kitamoto; Tadaomi Inoue, Shobumachi, both of Japan

[73] Assignee: Fuji Photo Optical Co., Ltd., Omiya, Japan

[21] Appl. No.: 622,854

[22] Filed: Oct. 16, 1974

[30] Foreign Application Priority Data

Oct. 17, 1974  Japan ................................ 49-118643

[51] Int. Cl.² .............................................. G05B 1/06
[52] U.S. Cl. ................................. 318/668; 318/676; 354/271; 354/44
[58] Field of Search ............... 318/640, 681, 668, 667, 318/676; 354/196, 197, 271, 43, 44

[56] References Cited

U.S. PATENT DOCUMENTS

| | | | |
|---|---|---|---|
| 2,393,407 | 1/1946 | Peterson | 354/271 |
| 2,393,408 | 1/1946 | Peterson | 354/271 |
| 3,405,335 | 10/1968 | Inose et al. | 318/668 |
| 3,541,941 | 11/1970 | Barr et al. | 354/196 |
| 3,743,912 | 7/1973 | Mashimo | 318/640 |
| 3,824,439 | 7/1974 | Pinckaers | 318/668 |

*Primary Examiner*—Robert K. Schaefer
*Assistant Examiner*—John J. Feldhaus
*Attorney, Agent, or Firm*—Gerald J. Ferguson, Jr.; Joseph J. Baker

[57] ABSTRACT

A servo-motor connected with potentiometers to be balanced is used for controlling the diameter of an iris of a lens system of variable focal length. One potentiometer to be used for detecting the position of control is connected with a plurality of change-over switches by way of different resistors. The change-over switches are changed in response to the change of the focal length to correct the iris with reference to the changed focal length.

4 Claims, 3 Drawing Figures

AUTOMATIC IRIS CONTROL MEANS FOR VARIABLE FOCAL LENGTH LENS SYSTEM

BACKGROUND OF THE INVENTION

1. Field of the Invention

This invention relates to an automatic iris control means for a lens system having a variable focal length, and more particularly to an automatic iris control means which corrects the aperture size of the iris of a variable focal length lens system of the type that has an interchangeable extender when the focal length thereof is changed.

2. Description of the Prior Art

When the focal length of a variable focal length lens system which as an interchangeable extender is changed, the F-value of the lens is also changed. Further, the T-value of the lens system which indicates the transmittivity of the lens system is also changed by the change of the focal length. Therefore, the aperture size of the iris of the lens system must be changed when the focal length is changed. In the conventional variable focal length lens system of the type that has an interchangeable extender, the iris is manually corrected in response to the change of the focal length.

SUMMARY OF THE INVENTION

The primary object of the present invention is to provide a means for automatically changing the aperture size of the iris of a variable focal length lens system in response to the change of the focal length.

The automatic iris control means in accordance with the present invention employs a potentiometer connected in series with resistors which are switched over in response to the change of the focal length of the lens system, said potentiometer being connected with an iris control means, whereby the iris is controlled in accordance with the changed F-value and T-value in response to the change of the focal length of the lens system.

Since the iris control means in accordance with the present invention employs a potentiometer connected with resistors which are changed over in accordance with the change of the focal length of the lens system, the correction of the aperture size of the iris is automatically made. Further, since the iris control is automatically corrected, the lens system is always in a correct condition to effect a normal exposure on a film loaded in a camera attached thereto.

DESCRIPTION OF THE PREFERRED EMBODIMENTS

Figure 1:
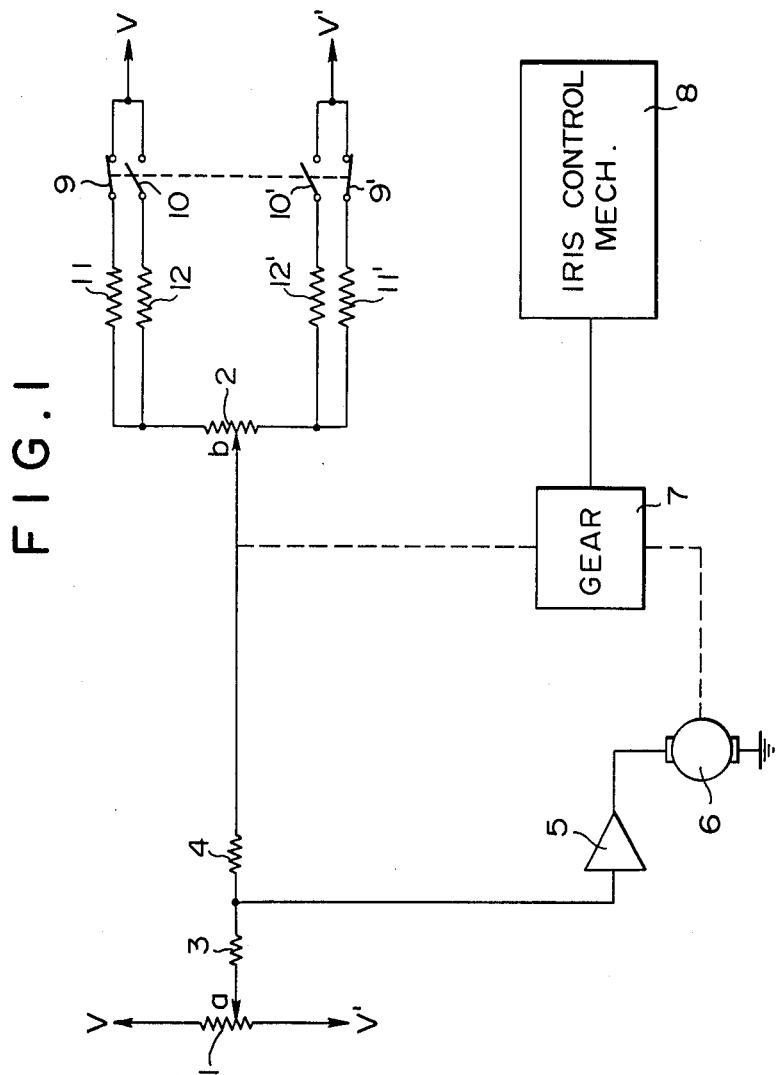
FIG. 1 is a circuit view illustrated together with a block diagram showing an embodiment of the automatic iris control means in accordance with the present invention.

Referring to FIG. 1 which shows an embodiment of the present invention, an iris control potentiometer 1 and an iris position detecting potentiometer 2 are connected with each other by way of a series of two resistors 3 and 4 and slidable contacts $a$ and $b$ slidably mounted in the potentiometers 1 and 2, respectively. A servo-amplifier 5 is connected with a connecting point between the two resistors 3 and 4, and is further connected with a servo-motor 6. A gear device 7 is connected with the servo-motor 6 and the slidable contact $b$ to transmit the rotation of the servo-motor 6 to the slidable contact $b$. The gear device 7 is further connected with an iris control means 8 so that the iris (not shown) may be controlled by the angle of rotation of the servo-motor 6. Switches 9, 9' and 10, 10' are associated with a focal length changing means in the lens system so that one pair of the switches are changed to the other pair in response to the change of the focal length of the lens system. In this embodiment, the switches 9 and 9' are normally closed under the standard lens condition, and the switches 10 and 10' are closed when the focal length or magnification of the lens system is changed from the standard value. Between the switches 9, 9', 10, 10' and the potentiometer 2, resistors 11, 11', 12 and 12' are connected, respectively, so that the resistance connected with both ends of the potentiometer may be changed when the switches are changed over from one pair to the other.

Figure 2:
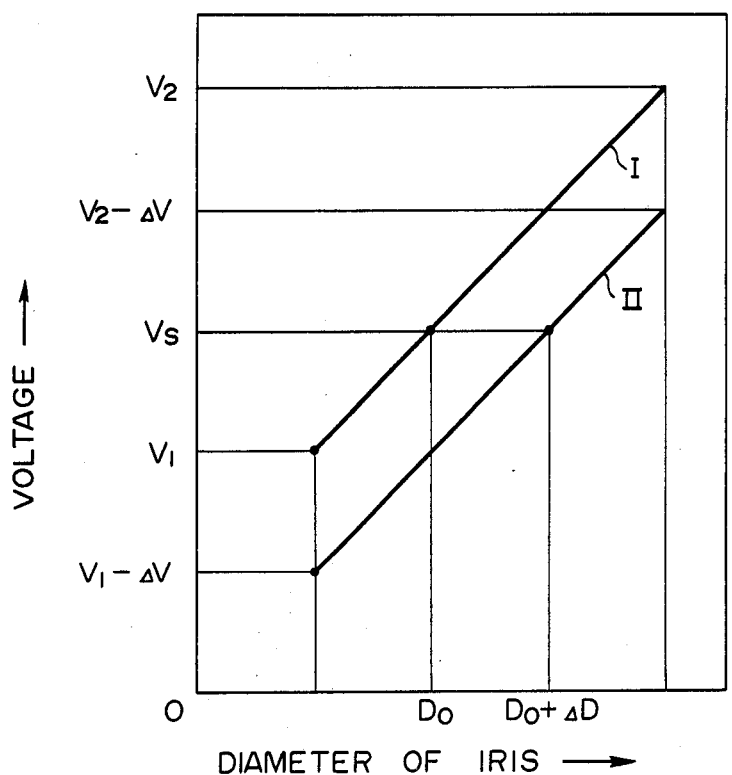
FIG. 2 is a graph which shows the relationship between the diameter of the iris and the voltage across the potentiometer to control the iris.

Referring to FIG. 2, the voltage at the slidable contact $b$ of the potentiometer 2 and the diameter of the iris has a relation as indicated by the line I changing from V1 to V2. When the switches 9 and 9' are changed to the switches 10 and 10', the relationship between the voltage and the diameter of the iris indicated by the line I is changed to the one indicated by the line II extending from V1-$\Delta$V to V2-$\Delta$V.

Now it is assumed that the servo-motor 6 is balanced at a position where the voltage at the potentiometer 2 is Vs and the diameter of the iris is $D_0$ as shown in FIG. 2. In response to the change of the switches from 9, 9' to 10, 10' accompanying the change of the focal length of the lens system, the relation between the voltage and the iris diameter is changed from the line I to the line II. Therefore, the diameter of the iris is changed from $D_0$ to $D_0+\Delta D$ to keep the balance of the servo-motor 6 as shown in FIG. 2.

Therefore, by properly selecting the resistance of the resistors 11, 11', 12 and 12' with respect to the change of the F-value and T-value required in response to the change of the focal length of the lens system, the iris is automatically controlled to correct the F-value and T-value in response to the change of the focal length.

In order to accomplish the above correction simply, it is desired to use a linear control system of the iris. When the control of the iris diameter is linear, the amount of correction of the iris diameter is always constant irrespectively of the size of the iris diameter.

In place of the resistors 11, 11', 12 and 12', variable resistors may be employed to facilitate the adjustment of the resistance thereof with respect to the characteristics of the lens system.

Figure 3:
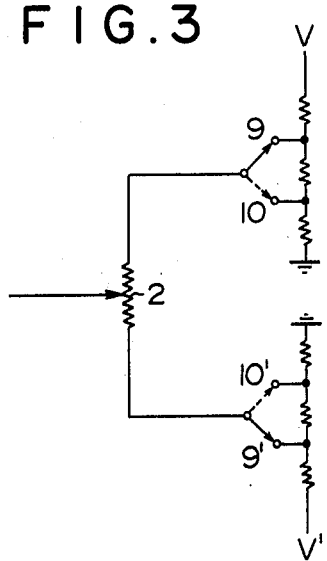
FIG. 3 is a circuit view which shows a potentiometer employed in a variation of the present invention connected with bleeder resistances instead of normal fixed or variable resistors.

Further, it is possible to replace the resistors 11, 11', 12 and 12' connected with the potentiometer 2 by bleeder resistors as shown in FIG. 3.

When the focal length of the lens system is changed in a number of focal lengths, a number of change-over switches are connected with the potentiometer.

We claim:

1. Means for controlling an iris of a variable focal length lens system comprising a servo-motor, a control potentiometer connected with the servo-motor for input of iris control signal, a position detecting potentiometer connected with the servo-motor to control the servo-motor by the balance made with reference to said control potentiometer, an iris control means connected with said servo-motor to control the diameter of an iris of the lens system, said iris control means being connected with said position detecting potentiometer so that the controlled position of the iris control means is detected by the detecting potentiometer, a plurality of change-over switches connected with said position detecting potentiometer, said switches being changed over in response to the change of the focal length of the lens system, and resistors having different resistance connected in series with said change-over switches, respectively.

2. Means for controlling an iris of a variable focal length lens system as defined in claim 1 wherein said resistors are bleeder resistors.

3. Means for controlling an iris of a variable focal length lens system as defined in claim 1 wherein said resistors are variable resistors.

4. Means for controlling an iris of a variable focal length lens system comprising a servo-motor, a control potentiometer connected with the servo-motor for input of iris control signal, a position detecting potentiometer connected with the servo-motor to control the servo-motor by the balance made with reference to said control potentiometer, an iris control means connected with said servo-motor to control the diameter of an iris of the lens system, said iris control means being connected with said position detecting potentiometer so that the controlled position of the iris control means is detected by the detecting potentiometer, a plurality of change-over switches connected with said position detecting potentiometer, said switches being changed over in response to the change of the focal length of the lens system, and resistors having different resistance connected in series with said change-over switches, respectively, said resistors being connected between the detecting potentiometer and the change-over switches.

* * * * *